United States Patent
Zeng et al.

(10) Patent No.: US 7,593,368 B2
(45) Date of Patent: Sep. 22, 2009

(54) METHOD AND SYSTEM FOR DECODING CONTROL CHANNELS USING PARTIAL COMBINING WITH WEIGHTED SNR

(75) Inventors: Huaiyu (Hanks) Zeng, Red Bank, NJ (US); Nelson Sollenberger, Farmingdale, NJ (US); Arie Heiman, Rannana (IL)

(73) Assignee: Broadcom Corporation, Irvine, CA (US)

(*) Notice: Subject to any disclaimer, the term of this patent is extended or adjusted under 35 U.S.C. 154(b) by 483 days.

(21) Appl. No.: 11/325,756

(22) Filed: Jan. 5, 2006

(65) Prior Publication Data

US 2007/0140164 A1    Jun. 21, 2007

Related U.S. Application Data

(60) Provisional application No. 60/752,752, filed on Dec. 21, 2005.

(51) Int. Cl.
*H04Q 7/00* (2006.01)
(52) U.S. Cl. .................. 370/332; 370/333; 370/335; 370/336
(58) Field of Classification Search .......... 370/329, 370/332, 343
See application file for complete search history.

(56) References Cited

U.S. PATENT DOCUMENTS

| | | | | |
|---|---|---|---|---|
| 5,341,401 | A * | 8/1994 | Farjh et al. ................ | 375/341 |
| 2001/0034209 | A1 * | 10/2001 | Tong et al. ................ | 455/69 |
| 2006/0221880 | A1 * | 10/2006 | Riddington et al. ........ | 370/310 |

OTHER PUBLICATIONS

Austin, Mark, Ph.D., SAIC and Synchronized Networks for Increased GSM Capacity, Sep. 2003, pp. 1-26.

* cited by examiner

*Primary Examiner*—Patrick N. Edouard
*Assistant Examiner*—Eric Elcenko
(74) *Attorney, Agent, or Firm*—McAndrews, Held & Malloy, Ltd.

(57) ABSTRACT

A method and system for decoding SACCH control channels in GSM-based systems with partial combining using weighted SNR may comprise combining least one weighted bit of a GSM slow associated control channel (SACCH) frame with at least one weighted bit of a subsequent GSM SACCH block based on burst signal to noise ratios (SNRs) of the GSM SACCH block and the subsequent GSM SACCH block. The burst SNR may be determined from a mid-amble of the GSM SACCH block and its subsequent GSM SACCH block. The burst SNRs of the GSM SACCH block may be translated to a corresponding plurality of scaling factors. At least a first weighting factor may be determined from the corresponding plurality of scaling factors. At least one weighted bit of the GSM SACCH block is determined utilizing the determined first weighting factor.

21 Claims, 15 Drawing Sheets

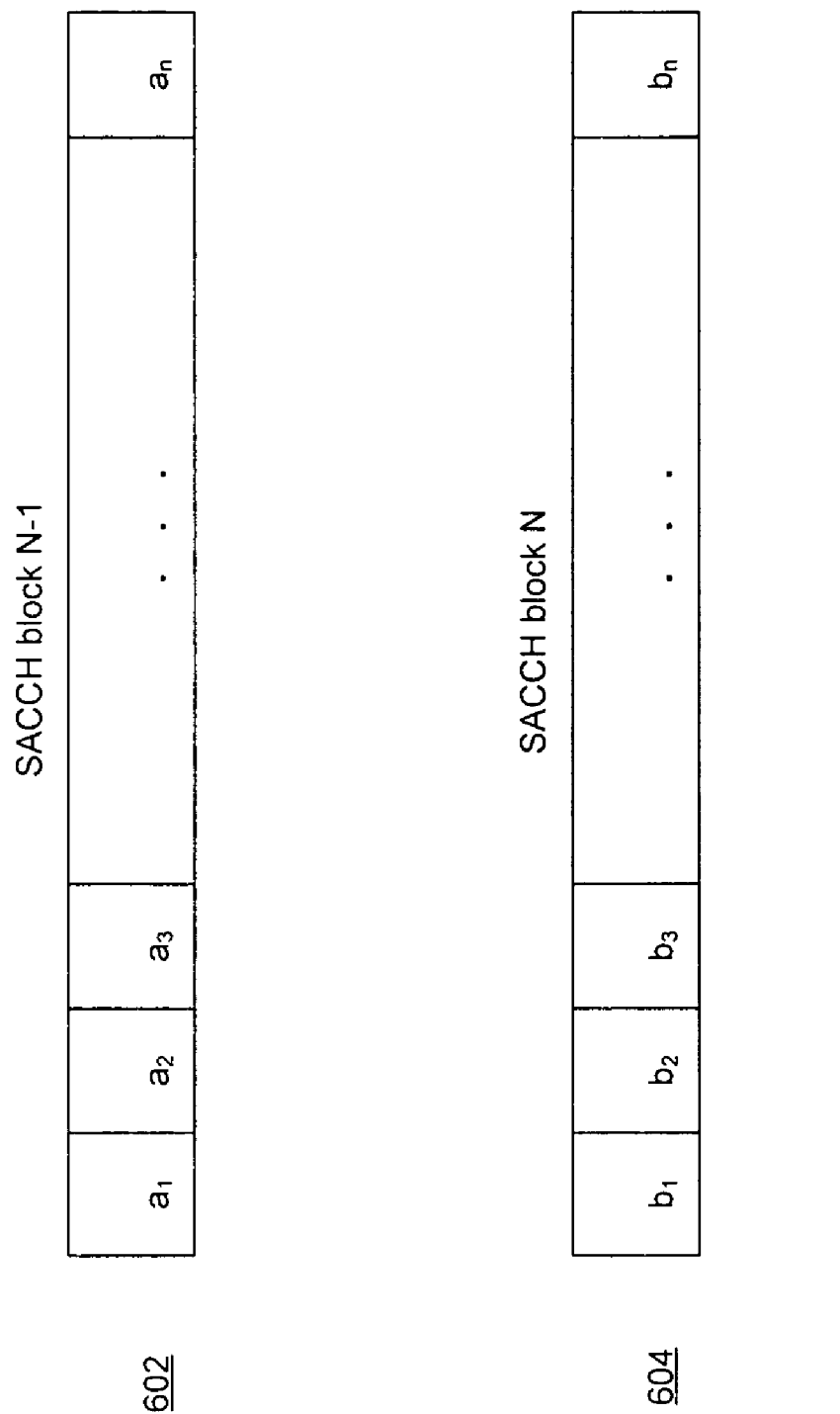

US 7,593,368 B2

METHOD AND SYSTEM FOR DECODING CONTROL CHANNELS USING PARTIAL COMBINING WITH WEIGHTED SNR

CROSS-REFERENCE TO RELATED APPLICATIONS/INCORPORATION BY REFERENCE

This application makes reference to, claims priority to, and claims the benefit of U.S. Provisional Application Ser. No. 60/752,752, filed on Dec. 21, 2005.

This application makes reference to: U.S. application Ser. No. 11/325,721, filed on Jan. 5, 2006; U.S. application Ser. No. 11/325,751, filed on Jan. 5, 2006; U.S. application Ser. No. 11/325.997, filed on Jan. 5, 2006; U.S. application Ser. No. 11/325,752, filed on Jan. 5, 2006; U.S. application Ser. No. 11/150,926, filed on Jun. 13, 2005; U.S. application Ser. No. 11/271,692, filed on Nov. 10, 2005; U.S. application Ser. No. 11/150,931, filed on Jun. 13, 2005; U.S. application Ser. No. 11/150,957, filed on Jun. 13, 2005; U.S. application Ser. No. 11/151,030, filed on Jun. 13, 2005; U.S. application Ser. No. 11/151,029, filed on Jun. 13, 2005; U.S. application Ser. No. 11/189,509, filed on Jul. 26, 2005; and U.S. application Ser. No. 11/189,634, filed on Jul. 26, 2005.

Each of the above stated applications is hereby incorporated herein by reference in its entirety.

FIELD OF THE INVENTION

Certain embodiments of the invention relate to decoding in wired and wireless communication systems. More specifically, certain embodiments of the invention relate to a method and system for decoding slow associated control channel (SACCH) data in GSM-based systems with partial combining using weighted signal to noise ratio (SNR).

BACKGROUND OF THE INVENTION

The evolution from wireless based voice only communication networks to wireless based voice and data communication networks has resulted in the development of general packet radio service (GPRS) and enhanced data rates for the global system for mobile communications (GSM) standards. Although speech still remains the dominant service by many cellular service providers, existing systems are being upgraded to provide greater support for data communication via the radio interface.

The GSM standard, for example, provides data services with bit rates up to 14.4 kbps for circuit-switched data and up to 22.8 kbps for packet based (non-circuit switched) data. For GSM, higher bit rates may be achieved utilizing technological advancements such as high-speed circuit-switched data (HSCSD) technology and general packet radio service (GPRS) technology, which are based on the original gaussian minimum shift keying (GMSK) modulation scheme employed by GSM. In eight-state phase shift keying (8PSK), there are eight possible states that a signal can transition to at any time. 8PSK is a variation of PSK and has a symbol rate that is one third of the bit rate. Minimum Shift Keying (MSK) is used in the GSM cellular standard. Frequency Shift Keying (FSK) and MSK produce constant envelope carrier signals, which have no amplitude variations, a desirable characteristic for improving power efficiency of transmitters. In practice, waveforms are filtered with a gaussian filter, resulting in a narrow spectrum and no time domain overshoot. MSK with a gaussian filter is termed GMSK. GMSK is a spectrally efficient modulation scheme and is useful in mobile radio systems. GMSK has a constant envelope, spectral efficiency, good bit error rate (BER) performance, and is self-synchronizing.

Enhanced data for global evolution (EDGE) provides an enhancement to GPRS, which leverages a new modulation scheme along with various coding and radio link enhancements to provide much higher bit rates and capacity than GPRS. Due to the higher bit rates and the need to adapt the data protection to the channel and link quality, the EDGE radio link control (RLC) protocol is somewhat different from the corresponding GPRS protocol. EDGE is a 3G technology that delivers broadband-like data speeds to mobile devices. It allows consumers to connect to the Internet and to send and receive data, including digital images, web pages and photographs, three times faster than possible with an ordinary GSM and or GPRS networks. EDGE enables GSM operators to offer higher-speed mobile-data access, serve more mobile-data customers, and free up GSM network capacity to accommodate additional voice traffic.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for decoding slow associated control channel (SACCH) data in GSM-based systems with partial combining using weighted SNR, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6 is an exemplary diagram illustrating a previous SACCH block and a current SACCH block that may be utilized in connection with an embodiment of the invention.

DETAILED DESCRIPTION OF THE INVENTION

Certain embodiments of the invention provide a method and system for decoding SACCH control channels in GSM-based systems with partial combining using weighted SNR. In various aspects of the invention, at least one weighted bit of a GSM slow associated control channel (SACCH) frame may be combined with at least one weighted bit of a subsequent GSM SACCH block based on burst signal to noise ratios (SNRs) of the GSM SACCH block and the subsequent GSM SACCH block. The burst SNR may be determined from a mid-amble of the GSM SACCH block and its subsequent GSM SACCH block. The burst SNRs of the GSM SACCH block may be translated to a corresponding plurality of scaling factors. At least a first weighting factor may be determined from the corresponding plurality of scaling factors. At least one weighted bit of the GSM SACCH block may be determined utilizing the first weighting factor.

Figure 1A:
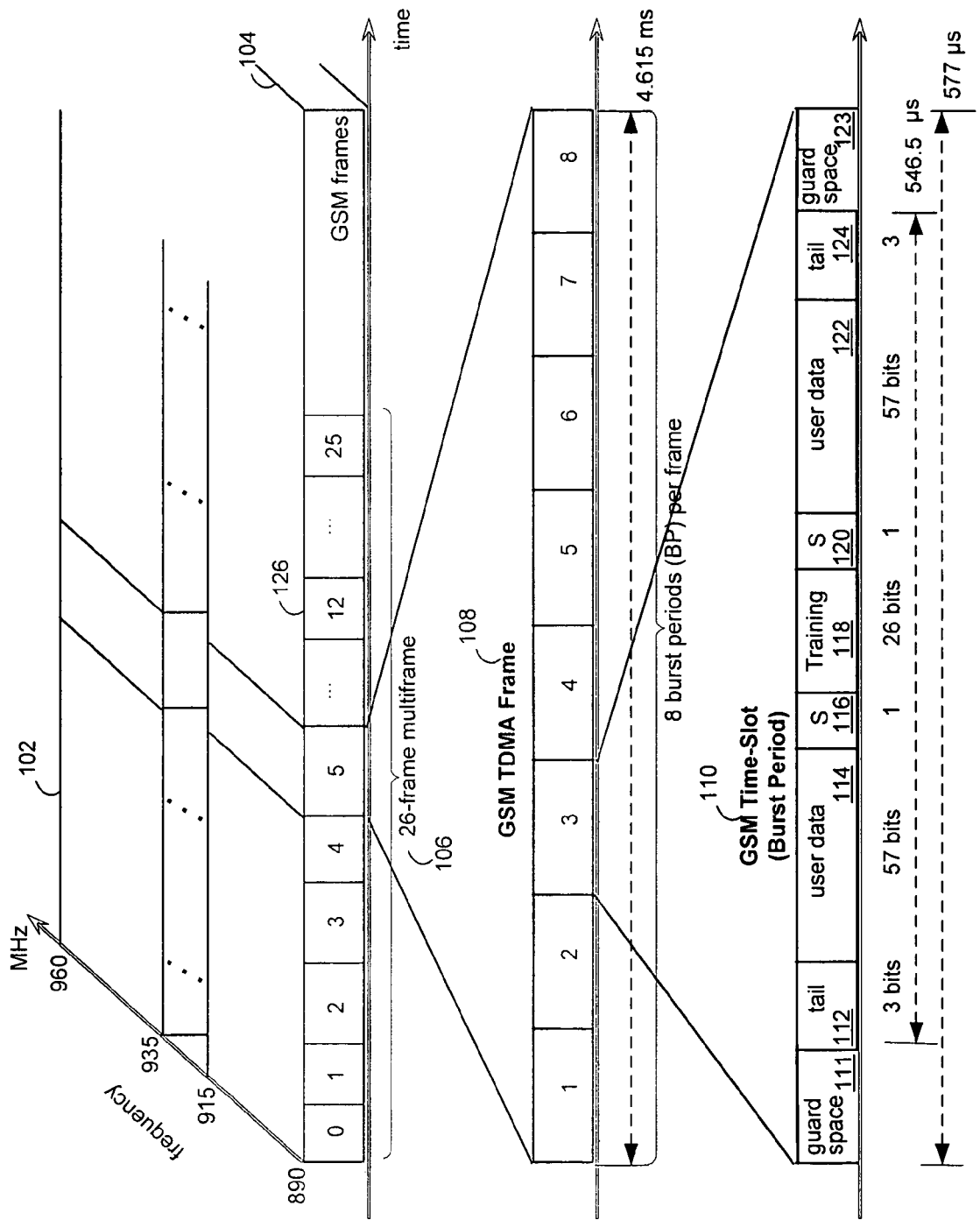
FIG. 1A is a graph illustrating an exemplary GSM frame and a burst period, which may be used in accordance with an embodiment of the invention.

FIG. 1A is a graph illustrating an exemplary GSM frame and a burst period, which may be used in connection with an embodiment of the invention. GSM utilizes a combination of Time and Frequency Division Multiple Access (TDMA/FDMA). Referring to FIG. 1A, there is shown a downlink frequency band 102, an uplink frequency band 104, a GSM TDMA frame 108 and a GSM timeslot or burst period 110. The GSM downlink frequency band 102 comprises a range of 935-960 MHz and the GSM uplink frequency band comprises a range of 104 is 890-915 MHz. The FDMA aspect of GSM involves the division of frequency of the 25 MHz bandwidth for the uplink frequency band 104 and the downlink frequency band 102 into 124 carrier frequencies, each of which comprises a bandwidth of 200 kHz. One or more carrier frequencies may be assigned per base station. The TDMA aspect of GSM involves the division in time of each carrier frequency into 8 time-slots, or burst periods (BPs), such as BP 110. One time-slot may be used for transmission by a mobile station and one time-slot may be used for reception.

The GSM timeslot or BP 110 may comprise tail portions 112 and 124, user data portions 114 and 122, stealing bits 116 and 120, a training sequence 118, and guard space 111 and 123. The tail portions 112 and 124 may each comprise 3 bits. The user data portions 114 and 122 may each comprise 57 bits, for example, and may be used for data transmission. The stealing bits 116 and 120 may each comprise 1 bit and may be used by fast associated control channel (FACCH) messages.

The training sequence 118 may comprise 26 bits, for example, and may be utilized by a mobile station receiver to synchronize and compensate for time dispersion produced by multipath propagation. The guard space 111 and 123 may each comprise 8.25 bits, for example, and may allow for propagation time delay in the arrival of bursts. The burst period 110 may be transmitted in 0.577 milliseconds.

Each group of 8 time-slots or burst periods, such as the burst period 110, may form a GSM TDMA frame 108. The GSM frame 108 may be transmitted every 4.615 ms. The GSM frames, such as the GSM frame 108, may be further grouped into multiframes. A GSM multiframe may comprise 26 TDMA frames or 51 TDMA frames. For example, the GSM multiframe 106 may comprise 26 TDMA frames, numbered 0, 1, . . . , 25. The 26-frame multiframe 106 may comprise 24 traffic channels (TCH), which may be communicated in frames 0, 1, . . . , 11 and frames 13, 14, . . . , 24. The $13^{th}$ frame 126 may be used for communicating a slow associated control channel (SACCH) block. The last $25^{th}$ frame is currently not used in GSM-based systems.

Figure 1B:
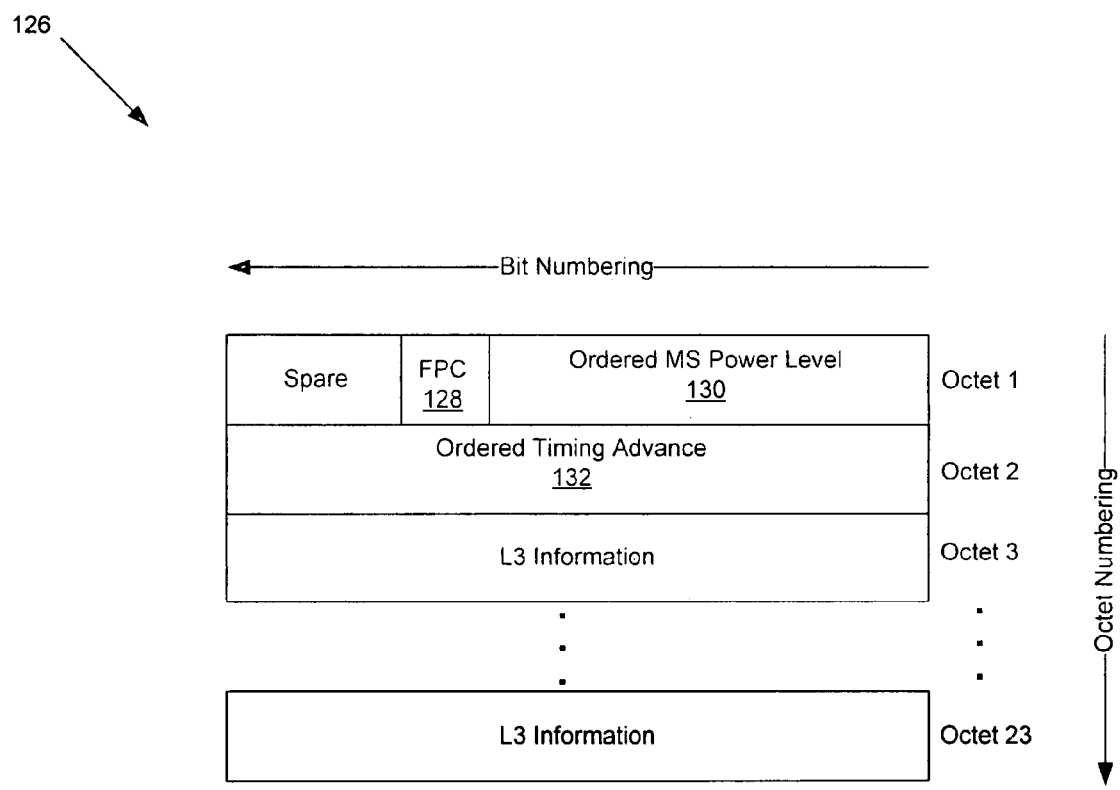
FIG. 1B is a block diagram of an exemplary slow associated control channel (SACCH) block, which may be used in accordance with an embodiment of the invention.

FIG. 1B is a block diagram of an exemplary slow associated control channel (SACCH) block, which may be used in accordance with an embodiment of the invention. Referring to FIG. 1B, the SACCH block 126 may comprise 23 octets for a total of 184 bits. Octets 1 and 2 may comprise level 1 (L1) control information and octets 3, 4, . . . , 23 may comprise level 3 (L3) system information. The L1 control information may comprise fast power control (FPC) bit information 128, ordered mobile station power level 130, and ordered timing advance 132. The spare bits within the SACCH block 126 may be encoded with the binary value 0, for example.

The FPC bit 128 may have a different interpretation depending on the channel mode of the channel to which the SACCH 126 is associated. For example, if the channel mode for a wireless connection is such that FPC may be used, the FPC bit 128 may indicate whether Fast Measurement Reporting and Power Control mechanism may be used. The FPC bit 128 may be coded as 0 when fast power control is not used, and 1 when fast power control is in use.

The ordered mobile station (MS) power level 130 may be used by a base station, for example, to indicate a desired transmission power level to an associated mobile station. The ordered timing advance information 132 may be communicated from a base station (BS) to an associated MS and may be used by the MS to advance its timings of transmissions to the BS so as to compensate for propagation delay.

During wireless communication of data between a BS and a MS, L3 system information in octets 3, . . . , 23 may stay unchanged. In instances when the MS is in handover or when receiving short messages, for example, L3 system information in the SACCH block 126 may change. In this regard, a continuous transmission of SACCH blocks in both uplink and downlink paths may be essential to proper exchange of data for an established wireless connection or for a wireless connection in handover. For example, an uplink path may be used by a MS to communicate measurement result messages to the BS via the SACCH 126. Similarly, a downlink path may be used by the BS to communicate system information and measurement requests to the MS via the SACCH 126.

Figure 2A:
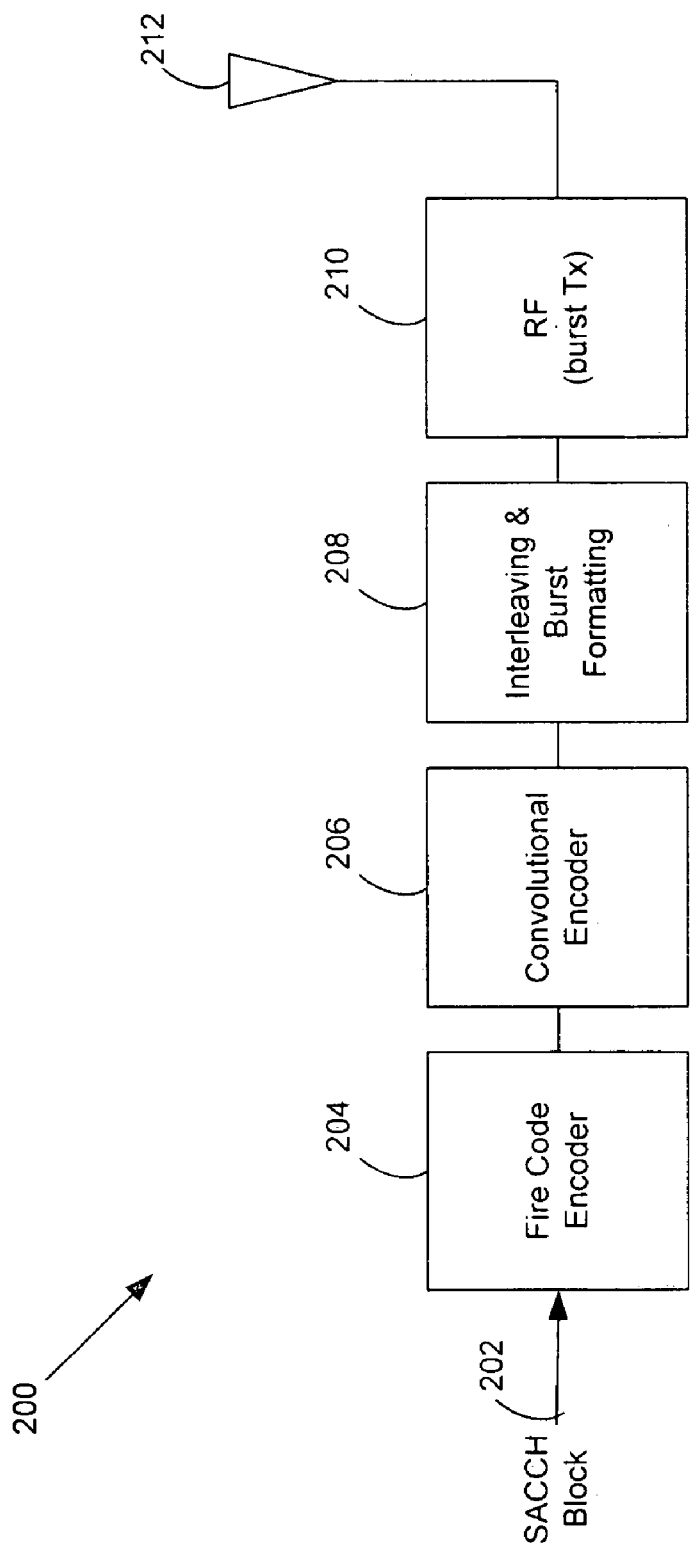
FIG. 2A is a block diagram of an exemplary base station (BS) for encoding and transmission of information, in accordance with an embodiment of the invention.

FIG. 2A is a block diagram of an exemplary base station (BS) for encoding and transmission of information, in accordance with an embodiment of the invention. Referring to FIG. 2A, the base station 200 may comprise a fire encoder 204, a convolutional encoder 206, an interleaving and burst formatting block (IBFB) 208, a radio frequency block (RFB) 210, and an antenna 212.

The Fire code encoder 204 may comprise suitable circuitry, logic, and/or code and may enable block coding of received bit sequence, such as the SACCH block 202. The fire encoder 204 may append the received 184 bits of the received SACCH block 202 with 40 parity bits. The 40 parity bits may be calculated by the encoder 204 based on the SACCH block 202 and may be used by a receiver during error correction. Furthermore, the 40 parity bits may be used for correction of a burst of errors, such as 11 errors within a single portion of transmitted data.

The convolutional encoder 206 may comprise suitable circuitry, logic, and/or code and may enable one-half rate encoding of fire encoded data. The convolutional encoder 206 may utilize multiplication by a finite-field polynomial and may generate 2 encoded bits for each input bit. In this regard, the number of bits at the output of the convolutional encoder 206 is double the number of input bits at the input of the encoder 206.

The IBFB 208 may comprise suitable circuitry, logic, and/or code and may enable interleaving of encoded bits so that sequential coded bits are not next to each other during transmission. In this regard, interleaving may be used for randomizing errors in a transmit channel. The IFBF 208 may also enable burst formatting or adding framing bits to the interleaved encoded bitstream, resulting in burst formation. Burst formatting may comprise, for example, adding a training sequence to the interleaved and encoded bitstream.

The RFB 210 may comprise suitable circuitry, logic, and/or code and may enable further processing, such as modulation, signal amplification and filtering of the interleaved and burst-formatted signal received form the IBFB 208. The resulting RF signal may be transmitted via the antenna 212.

Figure 2B:
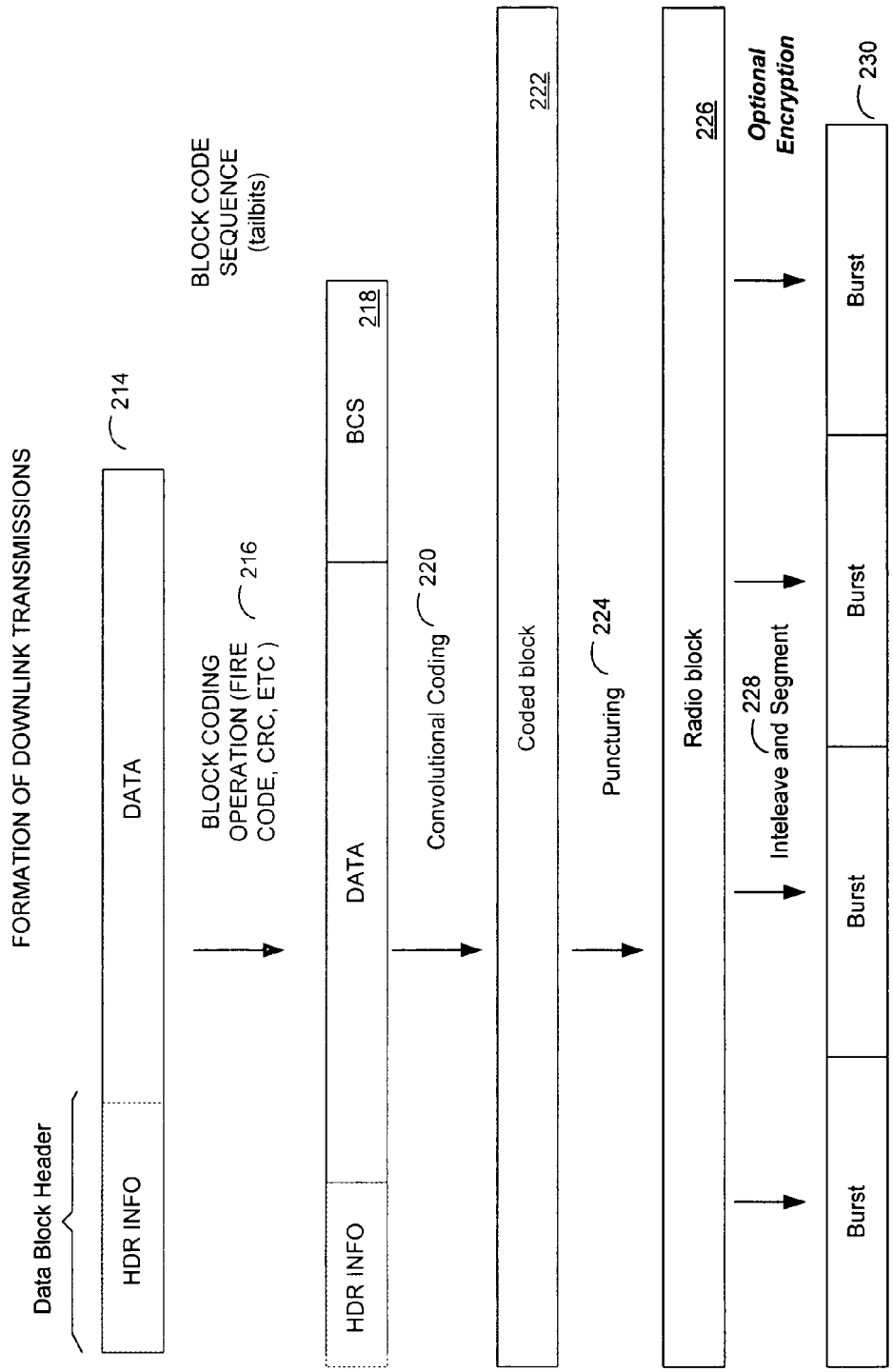
FIG. 2B is a block diagram illustrating formation of an exemplary downlink transmission, in accordance with an embodiment of the invention.

FIG. 2B is a block diagram illustrating formation of an exemplary downlink transmission, in accordance with an embodiment of the invention. Referring to FIGS. 2A and 2B, data 214, such as the 168-bits of L3 information within the SACCH block 202, may be initially uncoded and maybe accompanied by a data block header, such as the 16-bits of L1 information within the SACCH block 202. Block coding operations 216 may then be performed on the data block 214 resulting in a block coding sequence (BCS) 218, which is appended to the data 214. The block coding operation 216 may be used for error detection/correction for the data block 214 and may comprise a Fire Code operation.

Fire codes allow for either error correction or error detection. Fire Codes are a shortened binary cyclic code that appends redundancy bits to bits of the data Header and Data. After block coding has supplemented the data 214 with redundancy bits for error detection, convolutional coding 220 may be performed by the convolutional encoder 206 for calculation of additional redundancy for error correction to correct the transmissions caused by the radio channels. The convolutional encoding operation 220 may result in a coded data block 222. Some redundant bits generated by the convolutional encoder 206 may be punctured prior to transmission via the puncturing operation 224 to generate a radio block 226. In this regard, puncturing may increase the rate of the convolutional code and may reduce the redundancy per data block transmitted. In addition, puncturing may lower the bandwidth requirements such that the convolutional encoded signal may fit into the available channel bit stream. The convolutional encoded punctured bits of the radio block 226 may be communicated to the IBFB 208, which may shuffle various bit streams and segments of the interleaved bit streams into the 4 bursts 230. The bursts 430 may be further modulated and converted to RF by the RFB 210. The RF bursts may be transmitted via the antenna 212.

The layer 1 (L1) parameters, for example, timing and power parameters may not change significantly between successive iterations. For example, the L1 parameters between successive iterations may vary by a small threshold, for example, 20%. The layer 3 (L3) bits of the previous SACCH and the current SACCH may be required to be similar or within a small threshold. The similarity may be checked by calculating the Hamming distance between the two L3 sequences. If the Hamming distance is greater than a threshold, then the layer 3 (L3) bits of the previous SACCH and the current SACCH may not be similar. For GSM applications, for example, the redundancy algorithm may comprise searching for the MLSE that may also meet the Fire Code condition and the L1 and L3 constraints. In this regard, a set of k bit sequences {S1, S2, ..., Sk} may be determined from the MLSE that meet the Fire Code constraints. Once the set of k sequences is determined, a best sequence, Sb, may be determined that also meets L1 and L3 and Fire Code constraints.

Figure 3A:
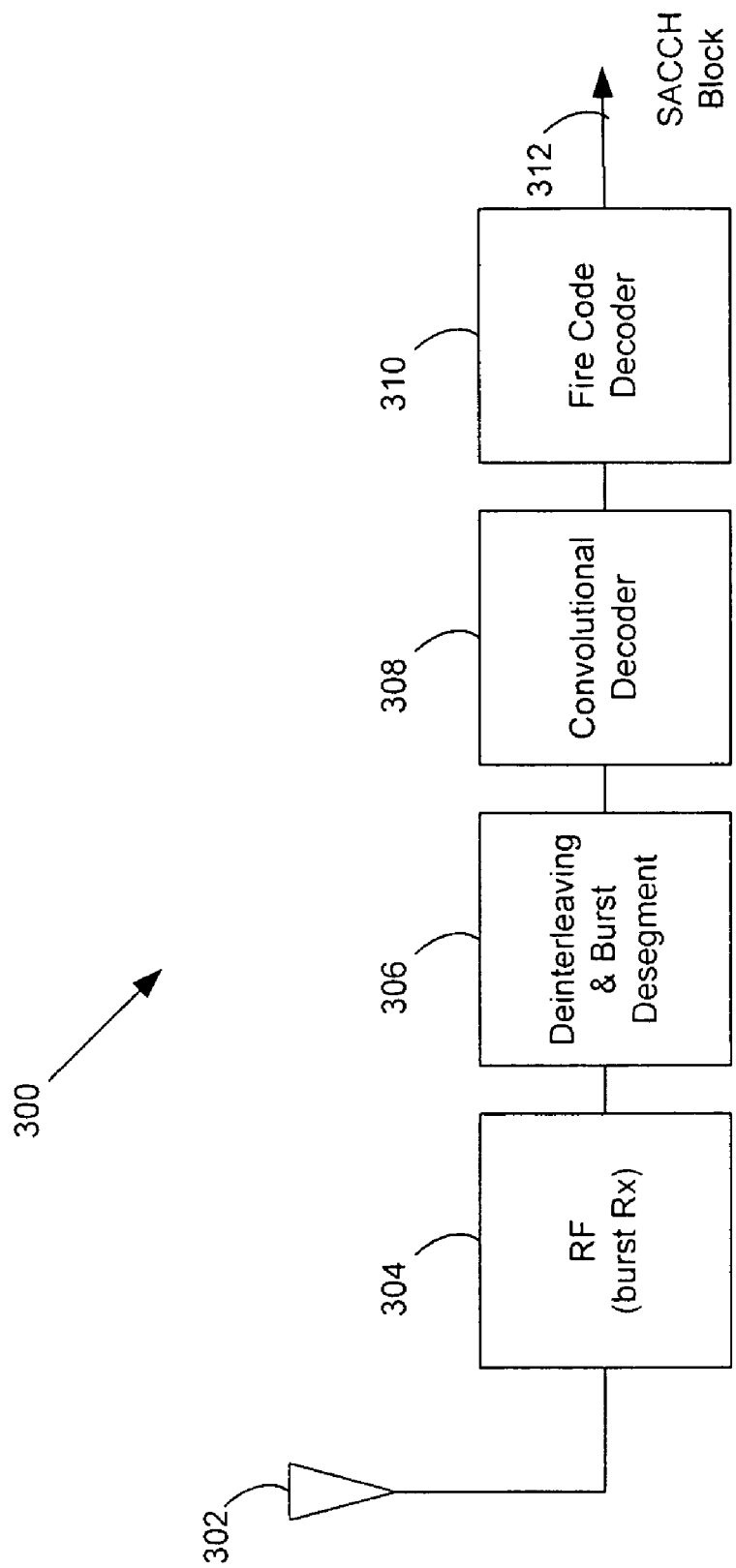
FIG. 3A is a block diagram of an exemplary mobile station (MS) for recovery of received data, in accordance with an embodiment of the invention.

FIG. 3A is a block diagram of an exemplary mobile station (MS) for recovery of received data, in accordance with an embodiment of the invention. Referring to FIG. 3A, the mobile station 300 may comprise a radio frequency block (RFB) 304, an antenna 302, a deinterleaver and burst desegmentation block (DBDB) 306, a convolutional decoder 308, and a fire decoder 310.

The RFB 304 may comprise suitable circuitry, logic, and/or code and may enable processing of RF bursts received via the antenna 302. For example, the RFB 304 may enable downconversion, signal amplification and filtering of the received RF bursts to generate interleaved and burst-formatted encoded bitstream data.

The DBDB 306 may comprise suitable circuitry, logic, and/or code and may enable deinterleaving of interleaved bitstream data. The DBDB 306 may also enable burst desegmentation by removing framing bits from the received bitstream data.

The convolutional decoder 308 may comprise suitable circuitry, logic, and/or code and may enable one-half rate decoding of the deinterleaved and desegmented data received from the DBDB 306. The convolutional decoder 308 may utilize Viterbi decoding to provide error correction, and may generate, for example, 1 decoded bit for each 2 input encoded bits. The Viterbi decoded data may be communicated to the fire decoder 310. The fire decoder 310 may comprise suitable circuitry, logic, and/or code and may enable decoding of a bit sequence received from the Viterbi decoder 308. The fire decoder 310 may extract 40 parity bits from the received bit sequence, generating 184 bits of the received SACCH block 312. The extracted 40 parity bits may be used by the fire decoder 310 to perform a Fire Code check for error detection within the SACCH block 312.

Figure 3B:
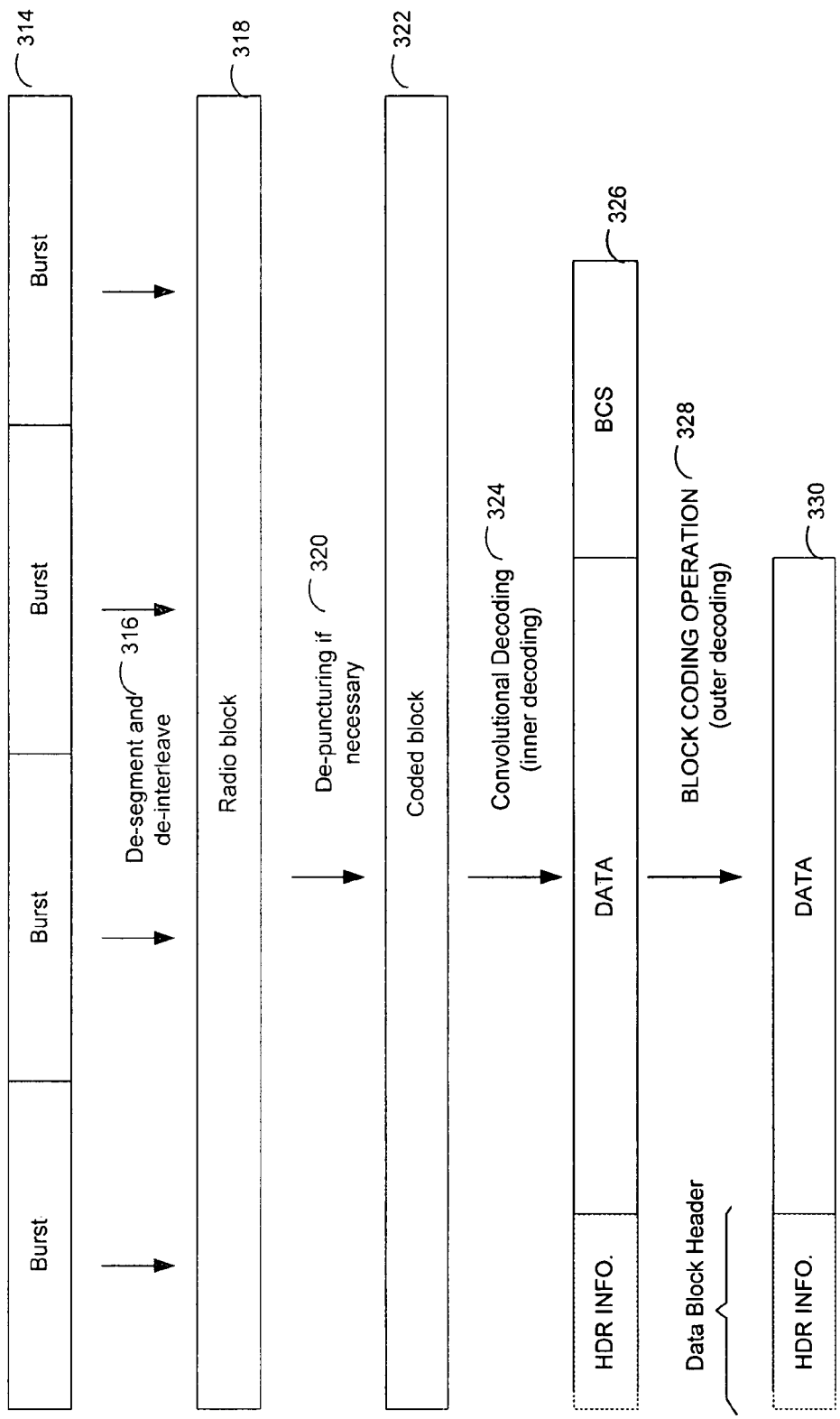
FIG. 3B is a block diagram illustrating recovery of data within a mobile station (MS), in accordance with an embodiment of the invention.

FIG. 3B is a block diagram illustrating recovery of data within a mobile station (MS), in accordance with an embodiment of the invention. Referring to FIGS. 3A and 3B, interleaved and segmented bursts 314 may be received by the DBDB 306. The DBDB 306 may apply a desegmentation and deinterleaving operation 316 to generate an encoded radio block 318. The encoded radio block 318 may be communicated to the Viterbi decoder 308 and a depuncturing operation 320 may be performed by the Viterbi decoder 308 to generate a coded block 322. A convolutional decoding operation 324 may be applied to the coded block 322 to generate the header information, data and block check sequence (BCS) 326. The generated header, data and BCS information 326 may be communicated to the fire decoder 310. The fire decoder 310 may apply a block decoding operation or an outer decoding operation 328 to extract the BCS and generate header information and data 330.

Figure 3C:
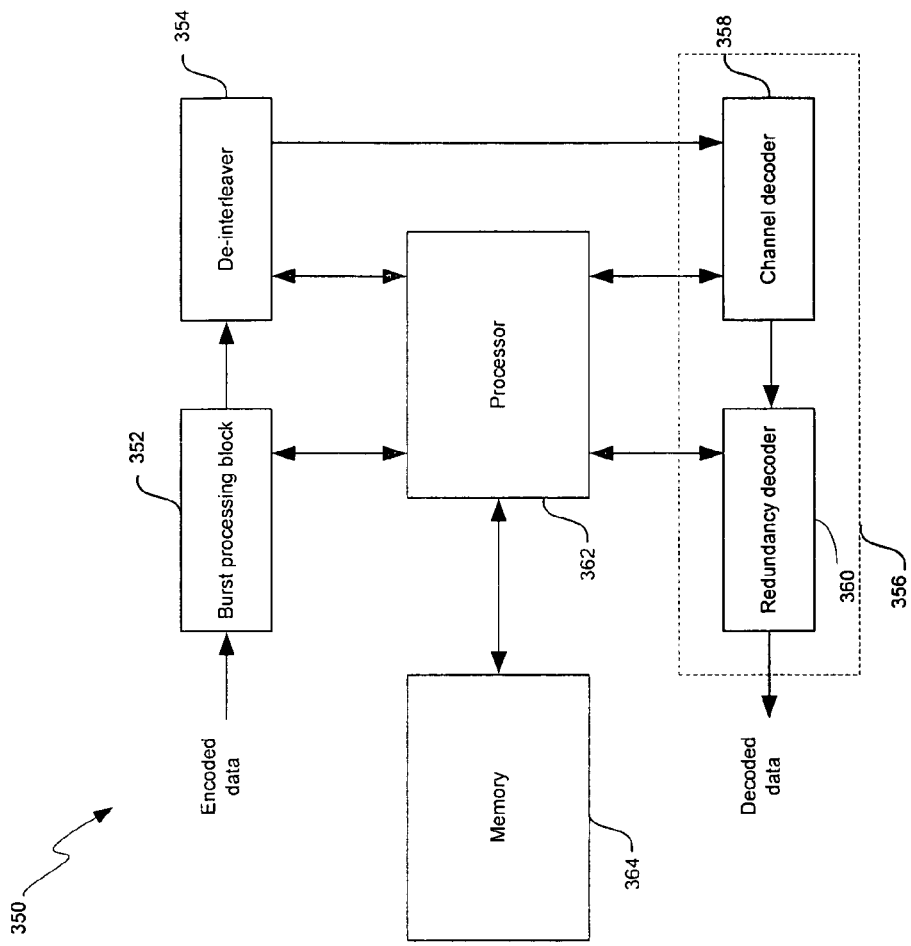
FIG. 3C is a block diagram illustrating an exemplary multilayer system comprising a processor and memory for improving decoding, in accordance with an embodiment of the invention.

FIG. 3C is a block diagram illustrating an exemplary multilayer system comprising a processor and memory for improving decoding, in accordance with an embodiment of the invention. Referring to FIG. 3C, there is shown a processor 362, a memory 364, the burst process block 352, a de-interleaver 354, and a frame process block 356. The frame process block 356 may comprise a channel decoder 358 and a media decoder 360.

The receiver 350 may comprise suitable logic, circuitry, and/or code that may operate as a wired or wireless receiver. The receiver 350 may utilize redundancy to decode interdependent signals, for example, signals that comprise convolutional encoded data. The U.S. application Ser. No. 11/189,509 (Attorney Docket No. 16072US02), filed Jul. 26, 2005 and the U.S. application Ser. No. 11/189,634 (Attorney Docket No. 16582US02) filed on Jul. 26, 2005, discloses decoding data using inherent redundancy, and are hereby incorporated herein by reference in their entirety. The receiver 350 may also utilize a multilayer approach for improving the decoding of interdependent signals or signals with memory. In this regard, the receiver 350 may perform a burst process and a frame process when processing the received interdependent signals. The multilayer approach performed by the receiver 350 may be compatible with a plurality of modulation standards.

The burst process block 352 may comprise suitable logic, circuitry, and/or code that may perform the burst process portion of the decoding operation of the receiver 350. The burst process block 352 may comprise, for example, a channel estimation operation and a channel equalization operation. Results from the channel estimation operation may be utilized by the channel equalization operation to generate a plurality of data bursts based on a maximum-likelihood sequence estimation (MLSE) operation. The output of the burst process block 352 may be transferred to the de-interleaver 354. The de-interleaver 354 may comprise suitable logic, circuitry, and/or code that may multiplex bits from a plurality of data bursts received from the burst process block 352 to form the frame inputs to the frame process block 356. Interleaving may be utilized to mitigate the effects of channel fading or distortion, for example.

The channel decoder 358 may comprise suitable logic, circuitry, and/or code that may decode the bit sequences in the input frames received from the de-interleaver 354. The channel decoder 358 may utilize the Viterbi algorithm during a Viterbi operation to improve the decoding of the input frames. The redundancy decoder 360 may comprise suitable logic, circuitry, and/or code that may perform content specific processing operations on the results of the channel decoder 358 for specified applications.

Regarding the frame process operation of the decoder 350, a standard approach for decoding convolution encoded data is to find the maximum-likelihood sequence estimate (MLSE) for a bit sequence. This may involve searching for a sequence X in which the conditional probability P(X/R) is a maximum, where X is the transmitted sequence and R is the received sequence, by using, for example, the Viterbi algorithm. In some instances, the received signal R may comprise inherent redundancy as a result of the encoding process by the signals source. This inherent redundancy may be utilized in the decoding process by developing a MLSE algorithm that may meet at least some of the physical constraints of the signals source. The use of physical constraints in the MLSE may be expressed as finding a maximum of the conditional probability P(X/R), where the sequence X meets a set of physical constraints C(X) and the set of physical constraints C(x) may depend on the source type and on the application. In this regard, the source type may be a control data, voice, music and/or a video source type.

The processor 362 may comprise suitable logic, circuitry, and/or code that may perform computations and/or management operations. The processor 362 may also be adapted to communicate and/or control at least a portion of the operations of the burst process block 352, the de-interleaver 354, the channel decoder 358 and the media decoder 360. The memory 364 may comprise suitable logic, circuitry, and/or code that may store data and/or control information. The memory 364 may store information that may be utilized and/or generated by the burst process block 352, the de-interleaver 354, the channel decoder 358 and the media decoder 360. In this regard, information may be transferred to and from the memory 364 via the processor 362, for example.

Figure 4A:
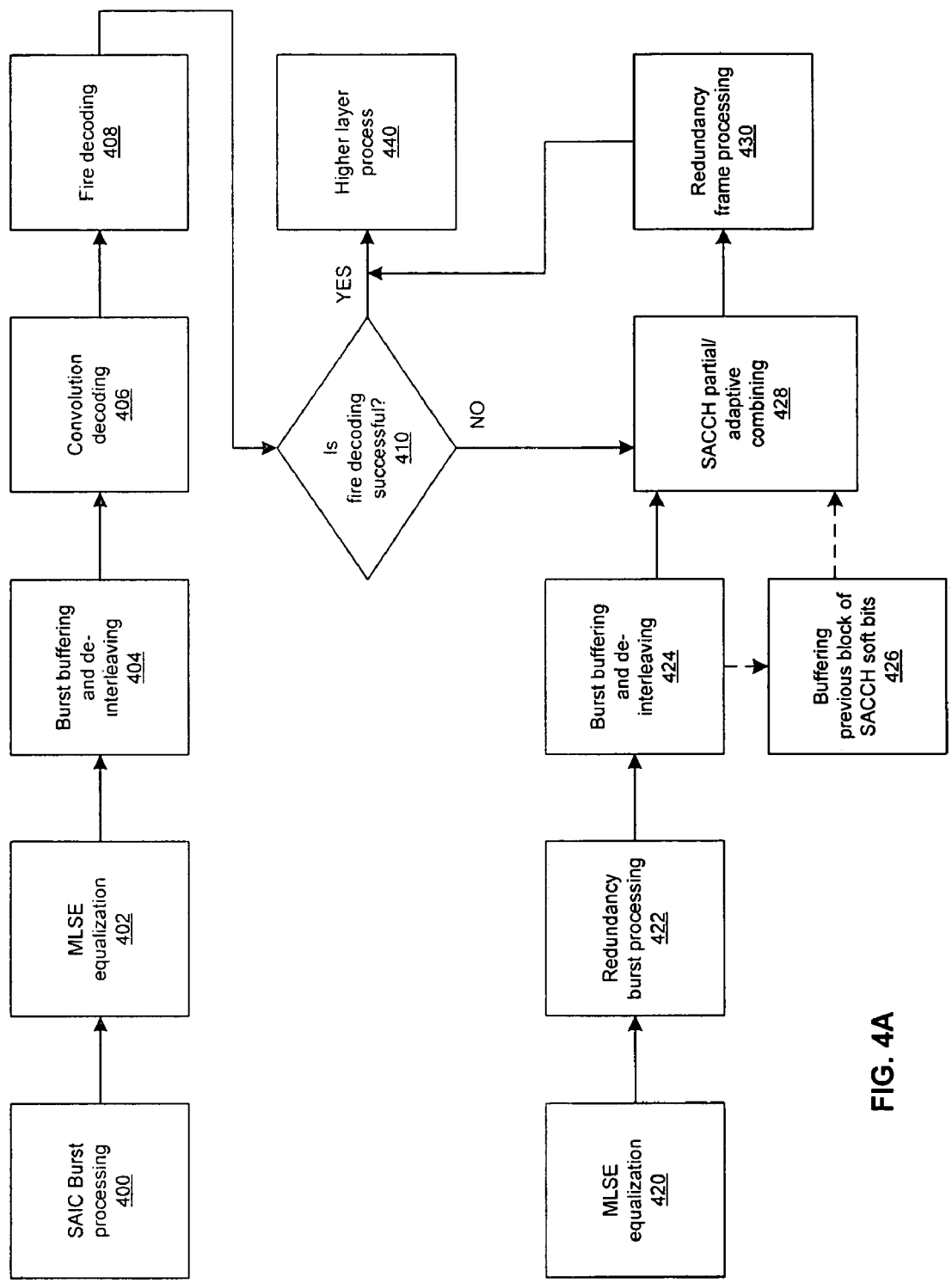
FIG. 4A is a flowchart illustrating exemplary steps for parallel decoding of received GSM-based data, in accordance with an embodiment of the invention.

FIG. 4A is a flowchart illustrating exemplary steps for parallel decoding of received GSM-based data, in accordance with an embodiment of the invention. Referring to FIG. 4A, the received signal bursts may be demodulated and digitized by, for example, the radio frequency block (RFB) 304. The received signal bursts may be processed in parallel in steps 400 and 420. The data to be decoded from the bursts may be SACCH blocks with control signals. The digital data processed by the steps 400 and 402 may comprise in-phase (I) and quadrature (Q) components of the received signal. In step 400, single antenna interference cancellation (SAIC) burst processing of the digitized signal may be performed. The SAIC burst processing may be performed by the burst processing block 352.

In step 402, the results from the channel estimation and SAIC burst processing may be utilized for channel equalization to generate a plurality of data bursts based on a maximum-likelihood sequence estimation (MLSE) equalization operation. In step 404, the bursts of data may be buffered, or stored. The bursts of data may be de-interleaved. For example, the base station 200 (FIG. 2A) may interleave data using the interleaving and burst formatting block 210 before transmission in order to reduce the effect of channel fading distortion.

In step 406, the de-interleaved data from step 404, which may be convolutional encoded, may be decoded by the convolutional decoder 308. Convolutional decoding may utilize, for example, the Viterbi algorithm. In step 408, the convolutional decoded data may be further decoded using a Fire Code algorithm. The Fire Code algorithm may comprise utilizing additional bits for error detection and error correction. However, in instances where there are too many erroneous bits, the Fire Code algorithm may not be able to correct the erroneous bits. In such instances, the Fire Code algorithm may indicate that the decoding was not successful.

In step 410, it may be determined whether the Fire Code decoding was successful. If the Fire Code decoding was successful, control may pass to step 440. In step 440, the decoded data may be communicated to higher layer processes for further processing. If the Fire Code decoding was not successful, control may pass to step 428. In step 420, the digitized input data processed in step 400 may be MLSE equalized. In step 422, the equalized data may be processed using redundancy burst processing algorithm. In step 424, the equalized data bursts may be buffered and de-interleaved as in step 404. The equalized data may be soft bits and digitized representations of the received analog signals. The conversion of the digitized representations to logic ones and zeros may result in hard bits.

For example, the base station 200 may modulate data such that a symbol represents one bit, and the transmitted symbols may be attenuated and/or modified by interference signals. A receiver, for example, the mobile station 300, may digitally sample the received symbols to generate digital representation of the received symbols. The received symbols may not map completely to logic ones or logic zeros because of attenuation and interference. Further processing may be necessary in order to determine whether the symbols should be set to a logic one or a logic zero. The symbols that are digitally represented may be referred to as soft bits. The soft bits that have been determined to be logic ones or logic zeros may be referred to as hard bits.

In step 426, the soft bits may be buffered and utilized to decode the next SACCH block, if necessary. In step 428, the soft bits may be enhanced by using partial combining methods or adaptive combining methods using soft bits from a previous SACCH block from step 426 and the current SACCH block from step 424. This is described in more detail with respect to FIGS. 5 and 6.

In step 430, the enhanced soft bits may be converted to hard bits. Redundancy frame processing, which may comprise convolutional decoding and Fire decoding, may be utilized for the conversion. The U.S. application Ser. No. 11/325,751, filed on Jan. 5, 2006, discloses frame processing using redundancy-based decoding algorithms, and is hereby incorporated herein by reference in its entirety. Control then passes to step 440. In step 440, the decoded data may be communicated to higher layer processes for further processing.

Figure 4B:
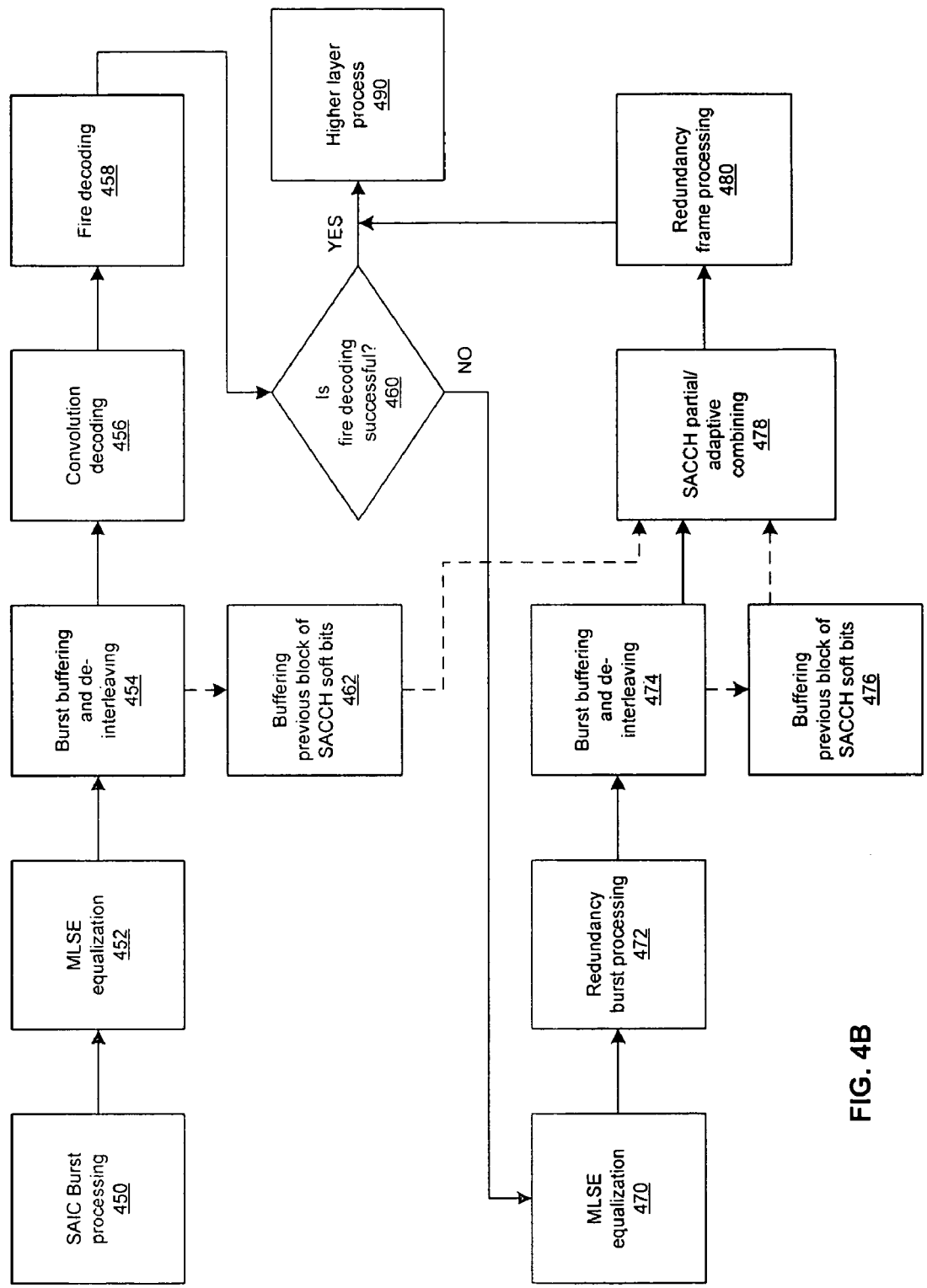
FIG. 4B is a flowchart illustrating exemplary steps for serial decoding of received GSM-based data, in accordance with an embodiment of the invention.

FIG. 4B is a flowchart illustrating exemplary steps for serial decoding of received GSM-based data, in accordance with an embodiment of the invention. FIG. 4B may comprise similar steps as FIG. 4A, however, FIG. 4B describes serial steps in decoding data, as opposed to parallel steps for decoding data. Referring to FIG. 4B, step 450 may comprise SAIC burst processing of the digitized signal. The burst processing may occur in, for example, the burst process block 352, which may execute, for example, channel estimation on signals received from the RFB 304.

In step 452, the results from the channel estimation may be utilized for channel equalization to generate a plurality of data bursts based on a maximum-likelihood sequence estimation (MLSE) equalization operation. In step 454, the bursts of data may be buffered, or stored. The bursts of data may be de-interleaved. For example, the base station 200 may de-interleave data before transmission in order to reduce the effect of channel fading distortion.

In step 456, the de-interleaved data from step 454, which may be convolutional encoded, may be decoded by the convolutional decoder 308. Convolutional decoding may utilize, for example, the Viterbi algorithm. In step 458, the convolutional decoded data may be further decoded using a Fire Code algorithm. The Fire Code algorithm may comprise utilizing additional bits for error detection and error correction. However, in instances where there are too many erroneous bits, the Fire Code algorithm may not be able to correct the erroneous bits. In such instances, the Fire Code algorithm may indicate that the decoding was not successful.

In step 460, it may be determined whether the Fire Code decoding was successful. If the Fire Code decoding was successful, control may pass to step 490. In step 490, the decoded data may be communicated to higher layer processes for further processing. If the Fire Code decoding was not successful, control may pass to step 470. In step 470, the digitized input data processed in step 450 may be MLSE equalized. In step 472, the equalized data may be processed using redundancy burst processing algorithm. In step 474, the equalized data bursts may be buffered and de-interleaved as in step 454. The equalized data may be soft bits and may be digitized representations of the received analog signals. The conversion of the digitized representations to logic ones and zeros may result in hard bits.

In step 476, the soft bits may be buffered for use in decoding the next SACCH block, if necessary. In step 478, the soft bits may be enhanced by using partial combining methods or adaptive combining methods using soft bits from a previous SACCH block from step 462 or from step 476 and the current SACCH block from step 474. This step is described in more detail with respect to FIGs. 5 and 6. In step 480, the enhanced soft bits may be converted to hard bits. Redundancy frame processing, which may comprise convolutional decoding and Fire decoding, may be utilized for the conversion. The U.S. application Ser. No. 11/325,751, filed on Jan. 5, 2006, discloses frame processing using redundancy-based decoding algorithms, and is hereby incorporated herein by reference in its entirety. Control then passes to step 490. In step 490, the decoded data may be communicated to higher layer processes for further processing.

Figure 5:
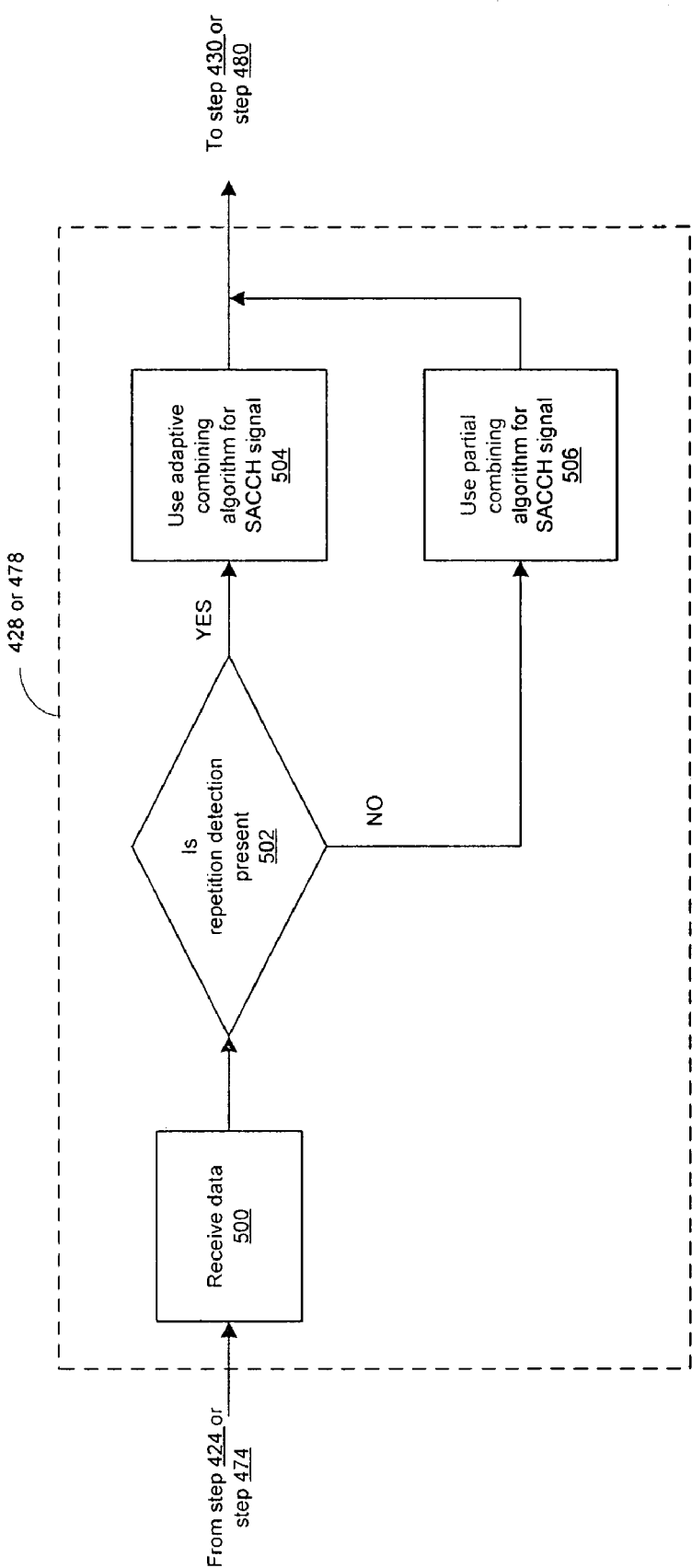
FIG. 5 is a flowchart illustrating exemplary steps for combining received SACCH blocks, in accordance with an embodiment of the invention.

FIG. 5 is a flowchart illustrating exemplary steps for combining received SACCH blocks, in accordance with an embodiment of the invention. FIG. 5 illustrates the process for enhancing soft bits in step 428 of FIG. 4A or step 478 of FIG. 4B. Referring to FIG. 5, in step 500, data from, for example, steps 424 and 426 in FIG. 4A or from steps 462, 474, and 476 in FIG. 4B may be processed. In step 502, it may be determined whether repetition is detected between previous SACCH block and current SACCH block. If repetition is detected between previous SACCH block and current SACCH block, control passes to step 504. In step 504, an adaptive combining method may enhance soft bits for the current SACCH block by directly combining, for example, weighted soft bits of the current SACCH block and the previous SACCH block. The bits combined may be the L1 header and parity bits, and L3 payload bits. Each soft bit in the previous SACCH block may be directly combined with the corresponding soft bit in the current SACCH block to take advantage of combining the gain of each soft bit from the two SACCH blocks. If repetition is not detected between previous SACCH block and current SACCH block, control passes to step 506. In step 506, a partial combining algorithm may enhance soft bits or the current SACCH block by combining, for example, weighted soft bits of the current SACCH block and the previous SACCH block. The bits combined may be the L3 payload bits.

Repetition detection may be a process for detecting if the control information in the previous SACCH block may be repeated in the current SACCH block. In an embodiment of the invention, SACCH may be partially repeated every M frames, for example, where M is determined from L3 constraints, and may not be consecutive frames. The various methods of repetition detection may be explained in more detail with respect to FIGS. 7A, 7B, and 7C.

If the parallel processing method of FIG. 4A is used, steps 504 and 506 may use data from steps 424 and 426. Accordingly, the enhanced soft bits for the previous SACCH block generated by using the redundancy burst processing method and the soft bits for the current SACCH block may be used to generate the enhanced soft bits for the current SACCH block.

If the serial processing method of FIG. 4B is used, steps 504 and 506 may use data from the step 474 and data from step 462 or step 476. The step 462 may provide soft bits for the current SACCH block. The step 474 may provide soft bits for the previous SACCH block using the redundancy burst processing method, while step 476 may provide soft bits for the previous SACCH block using the redundancy burst processing method. The soft bits from step 462 may be combined with the soft bits from the step 474 if Fire Code decoding was successful for the previous SACCH block. The soft bits from step 476 may be combined with the soft bits from step 474 if Fire Code decoding was not successful for the current SACCH block. Accordingly, the enhanced soft bits may be communicated to either step 430 in FIG. 4A or step 480 in FIG. 4B after being generated in step 504 or 506.

FIG. 6 is an exemplary diagram illustrating a previous SACCH block and a current SACCH block that may be utilized in connection with an embodiment of the invention. Referring to FIG. 6, there is shown a previous SACCH block 602 and a current SACCH block 604. The structure of the SACCH block may be substantially as described in FIG. 1B. The previous SACCH block 602 or the N−1$^{th}$ SACCH block may comprise bits from $a_1$ to $a_n$. The current SACCH block 604 or the N$^{th}$ SACCH block may comprise bits from $b_1$ to $b_n$. The N bits of the previous SACCH block 602 and the current SACCH block 604 may be the number of bits for the L3 payload if used for partial combining in step 506 of FIG. 5. The N bits of the previous SACCH block 602 and the current SACCH block 604 may also be the number of bits for the L1 header and parity bits, and L3 payload bits.

The weighted N bits of the previous SACCH block 602 may be combined with the weighted N bits of the current SACCH block 604. Let n be the soft bit index, a be the soft bits from the previous SACCH block 602, b be the soft bits from the current SACCH block 604. The combined soft bit c is calculated according to the following equation:

$$C(n) = W_a(n)a(n) + W_b(n)b(n)$$

where weighting factors $W_a(n)$ and $W_b(n)$ may be determined from a plurality of burst signal to noise ratios (SNR's) of the previous SACCH block 602 and a plurality of burst SNR's of the current SACCH block 604 respectively.

Figure 7A:
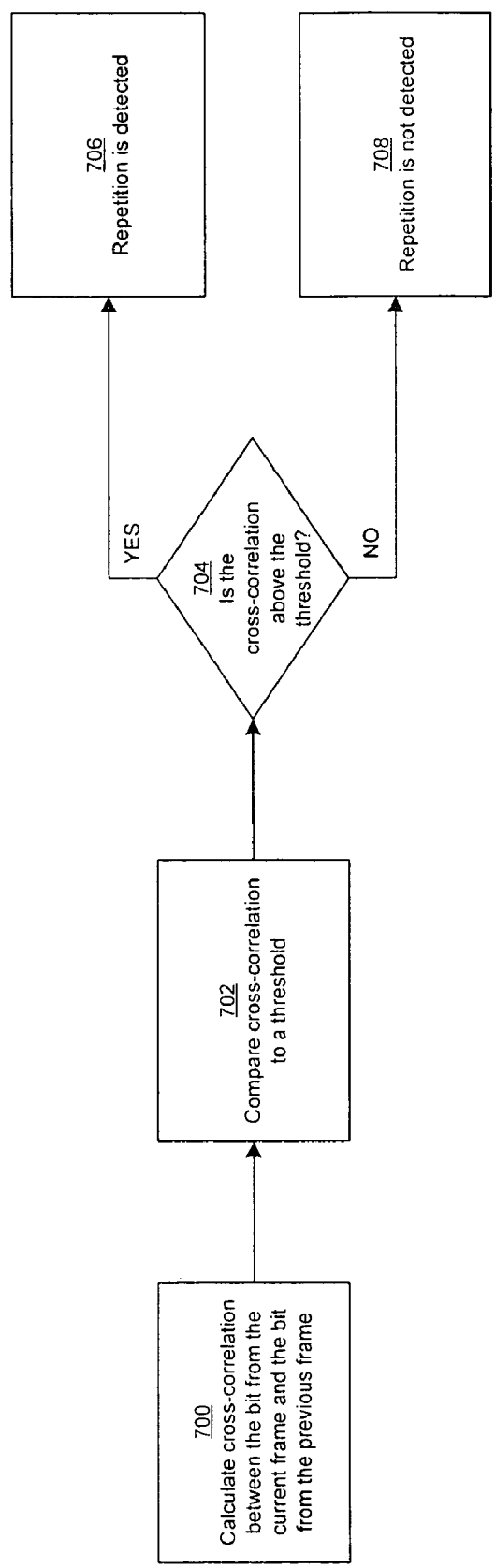
FIG. 7A is a flowchart illustrating exemplary steps for determining repetition of control information, in accordance with an embodiment of the invention.

FIG. 7A is a flow diagram illustrating exemplary steps for determining repetition of control information, in accordance with an embodiment of the invention. Referring to FIG. 7A, in step 700, the cross-correlation between the soft bits in a current SACCH block and the soft bits in a previous SACCH block may be calculated. In step 702, the calculated cross-correlation may be compared with a threshold. In step 704, it may be determined whether the calculated cross-correlation is above a certain threshold. If the calculated cross-correlation is above a certain threshold, control passes to step 706. In step 706, repetition may be detected between the previous SACCH block and the current SACCH block. If the calculated cross-correlation is not above a certain threshold, control passes to step 708. In step 708, repetition may not be detected between the previous SACCH block and the current SACCH block.

Figure 7B:
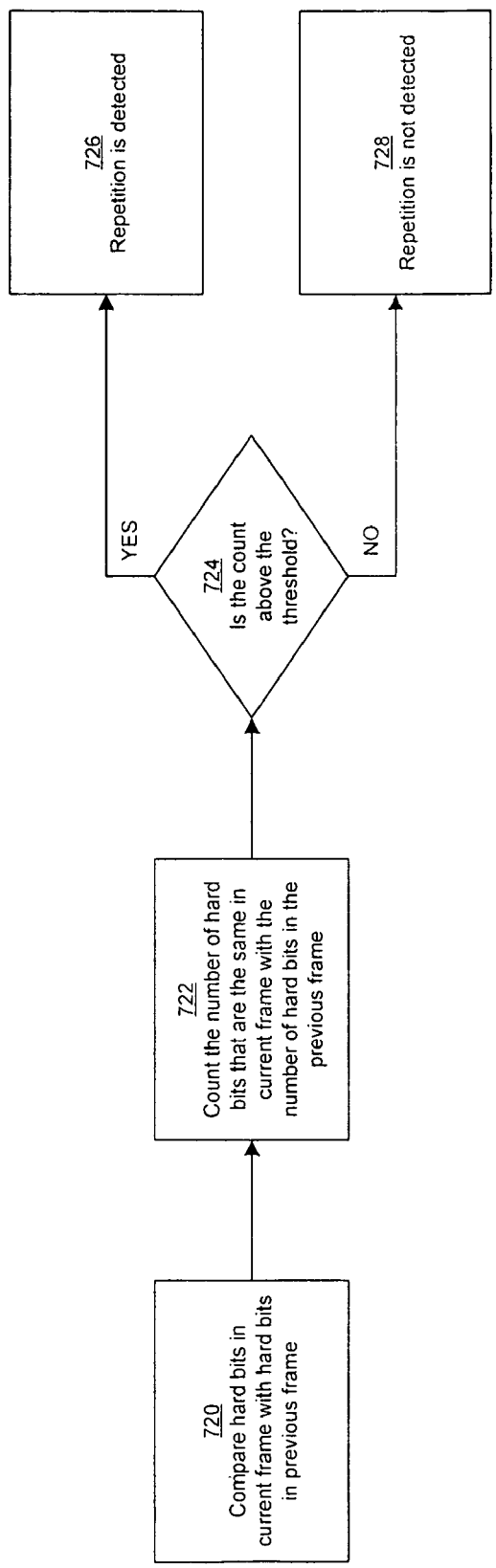
FIG. 7B is another flowchart illustrating exemplary steps for determining repetition of control information, in accordance with an embodiment of the invention.

FIG. 7B is another flow diagram illustrating exemplary steps for determining repetition of control information, in accordance with an embodiment of the invention. Referring to FIG. 7B, in step 720, the hard decision bits in a current SACCH block and the hard decision bits in a previous SACCH block may be calculated. In step 722, the number of hard decision bits common to the previous SACCH block and the current SACCH block may be calculated. In step 724, it may be determined whether the calculated number of hard decision bits common to the previous SACCH block and the current SACCH block is above a certain threshold. If the calculated number of hard decision bits common to the previous SACCH block and the current SACCH block is above a certain threshold, control passes to step 726. In step 726, repetition may be detected between the previous SACCH block and the current SACCH block. If the calculated number of hard decision bits common to the previous SACCH block and the current SACCH block is not above a certain threshold, control passes to step 728. In step 728, repetition may not be detected between the previous SACCH block and the current SACCH block.

Figure 7C:
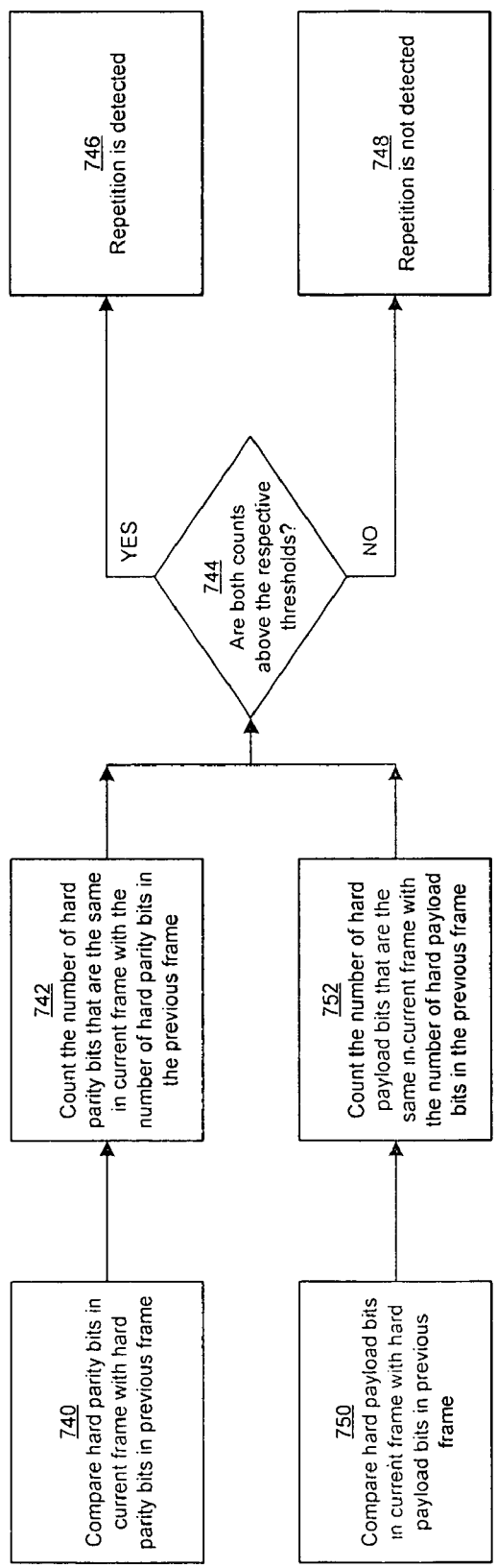
FIG. 7C is another flowchart illustrating exemplary steps for determining repetition of control information, in accordance with an embodiment of the invention.

FIG. 7C is another flowchart illustrating exemplary steps for determining repetition of control information, in accordance with an embodiment of the invention. Referring to FIG. 7C, in step 740, the hard parity bits in a current SACCH block and the hard parity bits in a previous SACCH block may be calculated. In step 742, the number of hard parity bits common to the previous SACCH block and the current SACCH block may be calculated. The number of hard parity bits common to the previous SACCH block and the current SACCH block may be sensitive to a change in the L1 header. In step 750, the hard payload bits in a current SACCH block and the hard payload bits in a previous SACCH block may be calculated. In step 752, the number of hard payload bits common to the previous SACCH block and the current SACCH block may be calculated.

In step 744, it may be determined whether the calculated number of hard header and payload bits common to the previous SACCH block and the current SACCH block and the calculated number of parity bits common to the previous SACCH block and the current SACCH block are above respective thresholds. If the calculated number of hard header and payload bits common to the previous SACCH block and the current SACCH block and the calculated number of parity bits common to the previous SACCH block and the current SACCH block are above respective thresholds, control passes to step 746. In step 746, repetition may be detected between the previous SACCH block and the current SACCH block. If the calculated number of hard header and payload bits common to the previous SACCH block and the current SACCH block and the calculated number of parity bits common to the previous SACCH block and the current SACCH block are not above respective thresholds, control passes to step 748. If repetition is detected, the L1 header bits, L3 message bits and parity bits may be utilized for full and/or partial combining of the previous SACCH block and the current SACCH block. In step 748, repetition may not be detected between the previous SACCH block and the current SACCH block.

The hard decision bits may comprise a plurality of hard parity bits and a plurality of hard payload bits. The layer 1 (L1) parameters, for example, timing and power parameters may not change significantly between successive iterations. For example, the L1 parameters between successive iterations may vary by a small threshold, for example, 20%. The layer 3 (L3) bits of the previous SACCH block and the current SACCH block may be required to be similar or within a small threshold. The similarity may be checked by calculating the Hamming distance between the two L3 sequences. If the Hamming distance is greater than a threshold, then the layer 3 (L3) bits of the previous SACCH block and the current SACCH block may not be similar.

Figure 8:
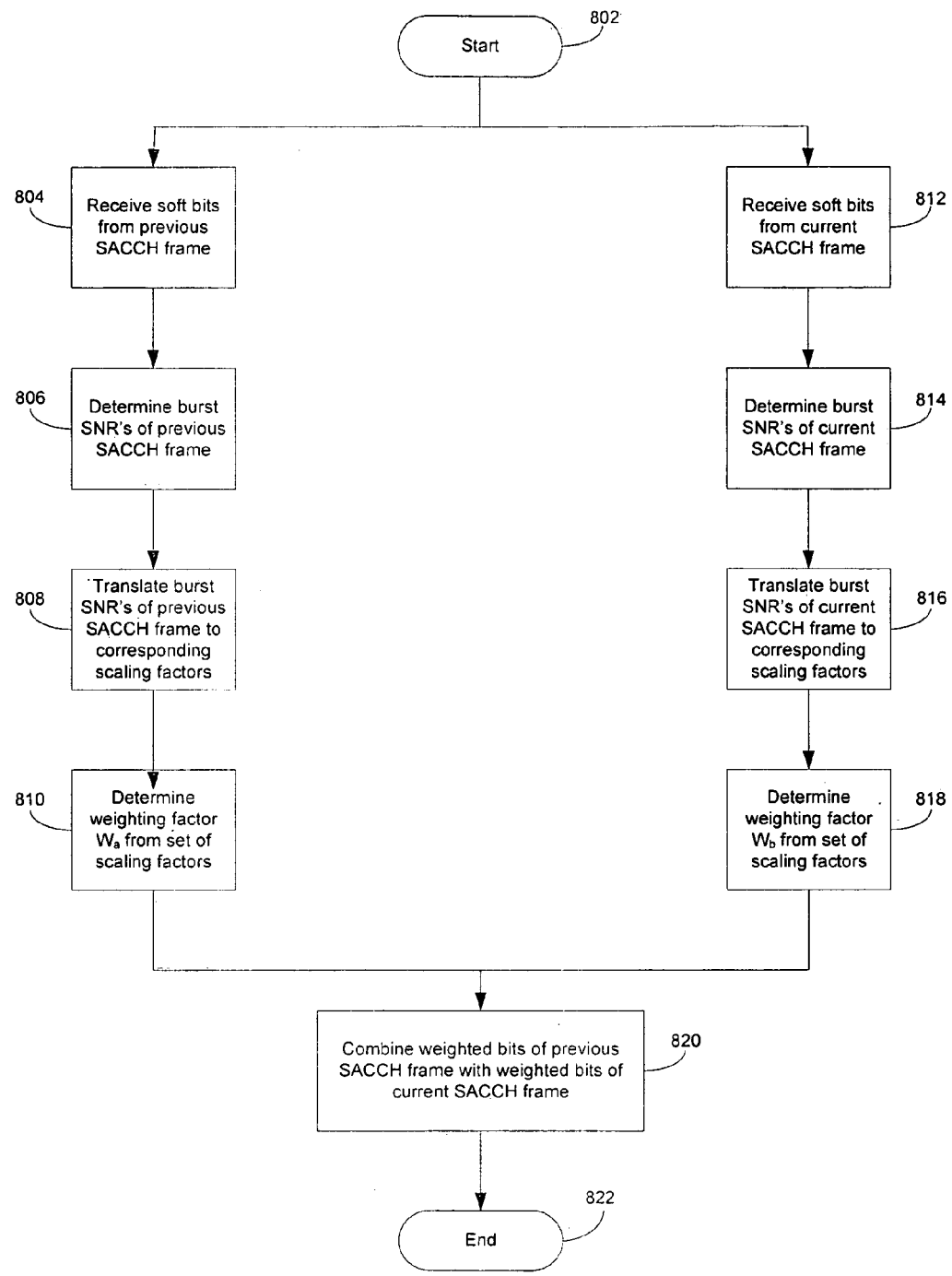
FIG. 8 is a flowchart illustrating exemplary steps for partial combining with weighted SNR, in accordance with an embodiment of the invention.

FIG. 8 is a flowchart illustrating exemplary steps for partial combining with weighted SNR, in accordance with an embodiment of the invention. Referring to FIG. 8, exemplary steps may start at step 802. In step 804, the soft bits from a previous SACCH block may be received. In step 806, the burst signal to noise ratios (SNR's) may be determined from the mid-amble of the previous SACCH block. A SACCH block comprises of 4 GSM bursts. The soft bit quality of each burst may be different due to the fading and/or frequency hopping. The burst SNR obtained from the mid-amble of the SACCH block may be an indicator of soft bit quality. The quality of the soft bits of the previous SACCH block may be related to the corresponding 4 burst SNRs of the previous SACCH block. In step 808, the four burst SNRs of the previous SACCH block may be translated to four corresponding scaling factors f(1), . . . , f(4), for example. In step 810, the scaling factor set {f(1), . . . , f(4)} may be de-interleaved and the weighting factor $W_a(n)$ may be determined by mapping the scaling factor set {f(1), . . . , f(4)}.

Similarly, in step 812, the soft bits from a current SACCH block may be received. In step 814, the burst signal to noise ratios (SNR's) may be determined from the mid-amble of the current SACCH block. The quality of the soft bits of the current SACCH block may be related to the corresponding 4 burst SNRs of the current SACCH block. In step 816, the four burst SNRs of the current SACCH block may be translated to four corresponding scaling factors g(1), . . . , g(4), for example. In step 818, the scaling factor set {g(1), . . . , g(4)} may be de-interleaved and the weighting factor $W_b(n)$ may be determined by mapping the scaling factor set {g(1), . . . , g(4)}.

In step 820, the weighted bits of the previous SACCH block may be combined with the weighted bits of the current SACCH block. Let n be the soft bit index, a be the soft bits from the previous SACCH block, b be the soft bits from the current SACCH block. The combined soft bit c is calculated according to the following equation:

$$C(n)=W_a(n)a(n)+W_b(n)b(n)$$

where weighting factors $W_a(n)$ and $W_b(n)$ may be determined from the scaling factor sets {f(1), . . . , f(4)} and {g(1), . . . , g(4)} respectively. Control then passes to end step 822.

In accordance with an embodiment of the invention, a method and system for partial combining with weighted SNR may comprise at least one processor 362 (FIG. 3C) that enables combining of at least one weighted bit of a GSM slow associated control channel (SACCH) block 602 with at least one weighted bit of another GSM SACCH block 604 based on burst signal to noise ratios (SNRs) of the GSM SACCH block 602 and a subsequent GSM SACCH block 604. The GSM SACCH block 604 may occur immediately after the GSM SACCH block 602 or may occur after one or more intervening frames. The GSM SACCH blocks 602 and 604 may either be consecutive blocks or be partially repeated every M frames, for example, where M may be determined from L3 constraints. The processor 362 enables determining of the burst SNR from a mid-amble of the GSM SACCH block 602 and its subsequent GSM SACCH block 604. The processor 362 enables translation of the burst SNRs of the GSM SACCH block 602 to a corresponding plurality of scaling factors {f(1), . . . , f(4)}, for example. The processor 362 enables determining at least a first weighting factor, $W_a$ from the corresponding plurality of scaling factors {f(1), . . . , f(4)}. At least one weighted bit of the GSM SACCH block 602 is determined utilizing the determined first weighting factor $W_a$. The processor 362 enables translation of the burst SNRs of the subsequent GSM SACCH block 604 to a corresponding plurality of scaling factors {g(1), . . . , g(4)}, for example. The processor 362 enables determining at least a second weighting factor, $W_b$ from the corresponding plurality of scaling factors {g(1), . . . , g(4)}. At least one weighted bit of the subsequent GSM SACCH block 604 is determined utilizing the determined second weighting factor $W_b$.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
combining at least one weighted bit of a GSM slow associated control channel (SACCH) block with at least one weighted bit of another GSM SACCH block based on burst signal to noise ratios (SNRs) of said GSM SACCH block and said another GSM SACCH block; and
determining said burst SNR from a mid-amble of said GSM SACCH block and a mid-amble of said another GSM SACCH block.

2. A method for signal processing, the method comprising:
combining at least one weighted bit of a GSM slow associated control channel (SACCH) block with at least one weighted bit of another GSM SACCH block based on burst signal to noise ratios (SNRs) of said GSM SACCH block and said another GSM SACCH block; and
translating said burst SNRs of said GSM SACCH block to a corresponding plurality of scaling factors.

3. The method according to claim 2, comprising determining at least a first weighting factor from said corresponding plurality of scaling factors.

4. The method according to claim 3, wherein said at least one weighted bit of said GSM SACCH block is determined utilizing said determined said at least first weighting factor.

5. A method for signal processing, the method comprising:
combining at least one weighted bit of a GSM slow associated control channel (SACCH) block with at least one weighted bit of another GSM SACCH block based on burst signal to noise ratios (SNRs) of said GSM SACCH block and said another GSM SACCH block; and
translating said burst SNRs of said another GSM SACCH block to a corresponding plurality of scaling factors.

6. The method according to claim 5, comprising determining at least a second weighting factor from said corresponding plurality of scaling factors.

7. The method according to claim 6, wherein said at least one weighted bit of said another GSM SACCH block is determined utilizing said determined said at least second weighting factor.

8. A machine-readable storage having stored thereon, a computer program having at least one code section for signal processing, the at least one code section being executable by a machine for causing the machine to perform steps comprising:
- combining at least one weighted bit of a GSM slow associated control channel (SACCH) block with at least one weighted bit of another GSM SACCH block based on burst signal to noise ratios (SNRs) of said GSM SACCH block and said another GSM SACCH block: and
- determining said burst SNR from a mid-amble of said GSM SACCH block and a mid-amble of said another GSM SACCH block.

9. A machine-readable storage having stored thereon, a computer program having at least one code section for signal processing, the at least one code section being executable by a machine for causing the machine to perform steps comprising:
- combining at least one weighted bit of a GSM slow associated control channel (SACCH) block with at least one weighted bit of another GSM SACCH block based on burst signal to noise ratios (SNRs) of said GSM SACCH block and said another GSM SACCH block: and
- translating said burst SNRs of said GSM SACCH block to a corresponding plurality of scaling factors.

10. The machine-readable storage according to claim 9, wherein said at least one code section comprises code for determining at least a first weighting factor from said corresponding plurality of scaling factors.

11. The machine-readable storage according to claim 10, wherein said at least one weighted bit of said GSM SACCH block is determined utilizing said determined said at least first weighting factor.

12. A machine-readable storage having stored thereon, a computer program having at least one code section for signal processing, the at least one code section being executable by a machine for causing the machine to perform steps comprising:
- combining at least one weighted bit of a GSM slow associated control channel (SACCH) block with at least one weighted bit of another GSM SACCH block based on burst signal to noise ratios (SNRs) of said GSM SACCH block and said another GSM SACCH block; and
- translating said burst SNRs of said another GSM SACCH block to a corresponding plurality of scaling factors.

13. The machine-readable storage according to claim 12, wherein said at least one code section comprises code for determining at least a second weighting factor from said corresponding plurality of scaling factors.

14. The machine-readable storage according to claim 13, wherein said at least one weighted bit of said another GSM SACCH block is determined utilizing said determined said at least second weighting factor.

15. A system for signal processing, the system comprising:
- one or more processors that are operable to combine at least one weighted bit of a GSM slow associated control channel (SACCH) block with at least one weighted bit of another GSM SACCH block based on burst signal to noise ratios (SNRs) of said GSM SACCH block and said another GSM SACCH block; and
- said one or more processors are operable to determine said burst SNR from a mid-amble of said GSM SACCH block and a mid-amble of said another GSM SACCH block.

16. A system for signal processing, the system comprising:
- one or more processors that are operable to combine at least one weighted bit of a GSM slow associated control channel (SACCH) block with at least one weighted bit of another GSM SACCH block based on burst signal to noise ratios (SNRs) of said GSM SACCH block and said another GSM SACCH block; and
- said one or more processors are operable to translate said burst SNRs of said GSM SACCH block to a corresponding plurality of scaling factors.

17. The system according to claim 16, wherein said one or more processors are operable to determine at least a first weighting factor from said corresponding plurality of scaling factors.

18. The system according to claim 17, wherein said at least one weighted bit of said GSM SACCH block is determined utilizing said determined said at least first weighting factor.

19. A system for signal processing, the system comprising:
- one or more processors that are operable to combine at least one weighted bit of a GSM slow associated control channel (SACCH) block with at least one weighted bit of another GSM SACCH block based on burst signal to noise ratios (SNRs) of said GSM SACCH block and said another GSM SACCH block; and
- said one or more processors are operable to translate said burst SNRs of said another GSM SACCH block to a corresponding plurality of scaling factors.

20. The system according to claim 19, wherein said one or more processors are operable to determine at least a second weighting factor from said corresponding plurality of scaling factors.

21. The system according to claim 20, wherein said at least one weighted bit of said another GSM SACCH block is determined utilizing said determined said at least second weighting factor.

* * * * *

UNITED STATES PATENT AND TRADEMARK OFFICE
CERTIFICATE OF CORRECTION

PATENT NO.      : 7,593,368 B2                          Page 1 of 1
APPLICATION NO. : 11/325756
DATED           : September 22, 2009
INVENTOR(S)     : Zeng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Twenty-first Day of September, 2010

David J. Kappos
*Director of the United States Patent and Trademark Office*